No. 769,798. PATENTED SEPT. 13, 1904.
B. L. W. & E. L. HANFELD.
VIBRATOR.
APPLICATION FILED FEB. 8, 1904.
NO MODEL. 2 SHEETS—SHEET 1.

Witnesses
Inventors
Benjamin L. W. Hanfeld
by Evangeline L. Hanfeld
Foster Freeman & Watson
Attorneys No. 769,798. PATENTED SEPT. 13, 1904.
B. L. W. & E. L. HANFELD.
VIBRATOR.
APPLICATION FILED FEB. 8, 1904.
NO MODEL. 2 SHEETS—SHEET 2.

Witnesses
Inventors
Benjamin L. W. Hanfeld
Evangeline L. Hanfeld
Attorneys

No. 769,798. Patented September 13, 1904.

UNITED STATES PATENT OFFICE.

BENJAMIN L. W. HANFELD AND EVANGELINE L. HANFELD, OF NEW YORK, N. Y.

VIBRATOR.

SPECIFICATION forming part of Letters Patent No. 769,798, dated September 13, 1904.

Application filed February 8, 1904. Serial No. 192,379. (No model.)

*To all whom it may concern:*

Be it known that we, BENJAMIN L. W. HANFELD and EVANGELINE L. HANFELD, citizens of the United States, residing in the city, county, and State of New York, have invented certain new and useful Improvements in Vibrators, of which the following is a specification.

Our invention relates to tissue-oscillators, and has for its object to improve and simplify such devices; and to these ends it consists in an oscillator embodying the various features of invention, substantially as hereinafter more particularly pointed out.

Figure 1:
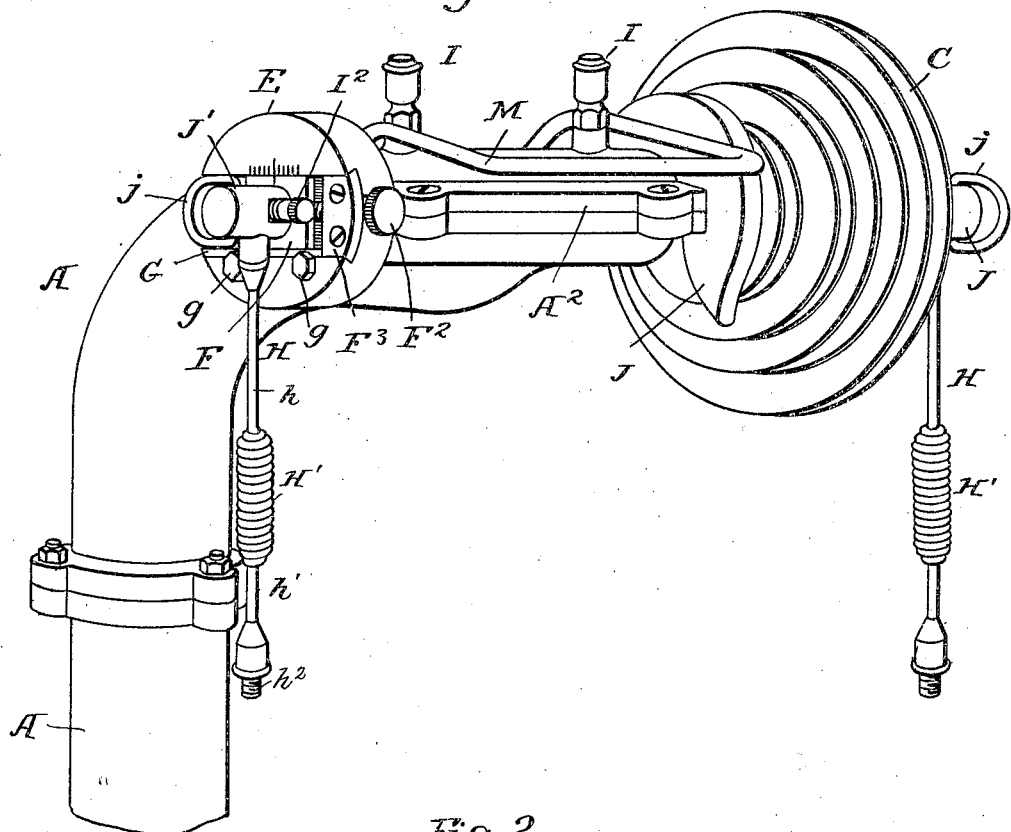
Figure 2:
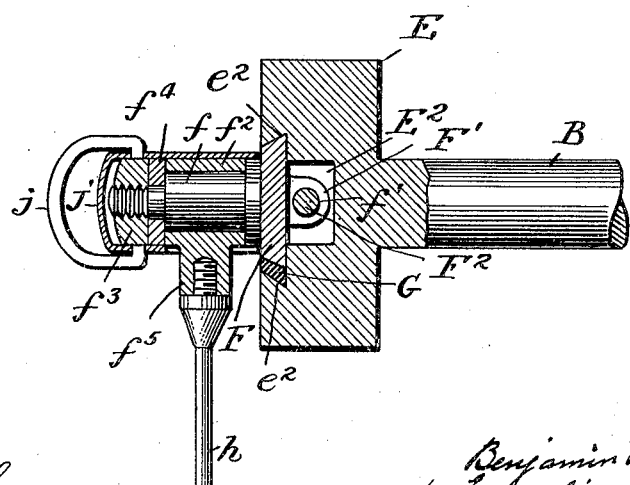
Figure 3:
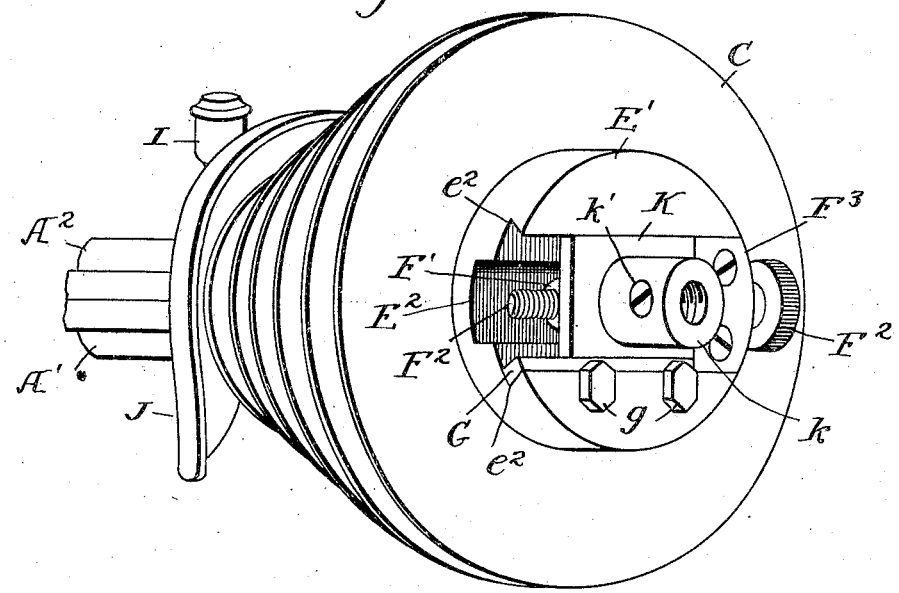
Figures 4, 5:
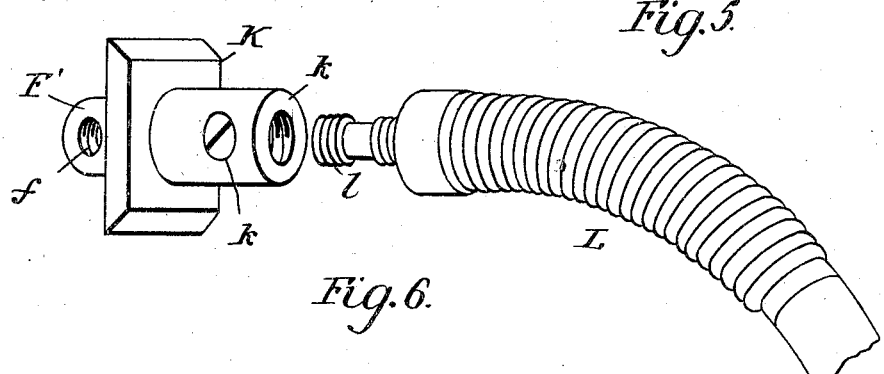
Figure 6:
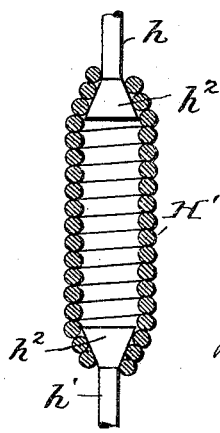

Referring to the accompanying drawings, Figure 1 is a perspective view showing an oscillator embodying our invention. Fig. 2 is a sectional view showing some of the parts. Fig. 3 is a perspective view of one end of the device, showing an interchangeable slide. Fig. 4 is a perspective view of the slide detached. Fig. 5 is a perspective view of a flexible shaft adapted to be attached to the slide, and Fig. 6 is an enlarged sectional view of the tension-spring device of the connectors.

Referring to the drawings, A represents any suitable standard or base upon which is mounted a suitable neck or headpiece A', which is preferably shown curved and projecting laterally, as indicated, and adapted to furnish a support for the operating mechanism. In the present instance it is provided with a detachable plate $A^2$, fitting on the extended portion of the neck or head and forming an extended bearing for the shaft B. This shaft B is provided with some suitable means for rotating it, shown as the multiple cone-pulley C, mounted on the shaft and adapted to be driven by any suitable belt or otherwise. Secured to the opposite ends of the shaft B are disks or carriers E E', which are adapted to rotate with the shaft. These disks or carriers are provided with means for supporting the oscillator studs or pins $f$, and in the present instance we provide the disks or carriers with channels $E^2$, extending across their faces, the sides of the channels being undercut or beveled, as indicated at $e^2$. Mounted in these channels are slides F, having beveled edges practically corresponding with the beveled or undercut edges $e^2$; but these slides are not as wide as are the channels $E^2$, and in order to fill the space in the channels we provide gibs G, which are provided with tapered or beveled sides, so as to practically form wedge-pieces adapted to fit in the channels B and secure the slides therein. These wedge-pieces are held in place by any suitable pieces, as the hexagonal-headed screws $g$.

The slides are provided with means whereby they may be adjusted in the channels, and, as shown, there is an extension F', provided with a screw-threaded opening $f'$, adapted to receive an adjusting-screw $F^2$, which is mounted in the disks or carriers. In the present instance we have shown detachable plates $F^3$, secured in the end of the channel and forming an abutment for the adjusting-screws $F^2$. By these means it will be seen that the slides F can be adjusted in any position, either in the center of the disks or carriers or eccentric to such center by said adjusting-screws $F^2$, and then the gibs or wedge-pieces G can be forced into position by the screws $g$, securely locking and holding the slides in the desired position. This furnishes a ready means for conveniently and accurately adjusting the slides, as well as for securing them in the adjusted position, so that they will be prevented from moving from this position under the rapid rotation of the shaft when they operate in the manner hereinafter set forth.

Mounted on the studs or pins $f$ are sleeves $f^2$, and these are conveniently held upon said studs by any suitable device, as the nuts $f^3$ and washers $f^4$, so that the sleeves are free to rotate on the studs. These sleeves are provided with projections or studs $f^5$, adapted to receive the connectors hereinafter described, and while they may be of various shapes and forms they are shown in the form of screw-threaded projections.

The connectors H each consist of two rods $h\ h'$, each provided with means for coupling it to the studs or projections and to a suitable handle or strap, the particular means shown being the threaded extensions $h^2$, and these two rods are united by a tension-spring H' in such a way as to give a positive yet elastic movement to the rod $h'$ in one direction and to allow the rods $h\,h'$ to approach each other freely in the opposite direction. Thus, as best shown in Fig. 6, the spring H' is made up of a number of spiral coils, the coils tapering toward the ends, so as to embrace the rods $h\,h'$, and these rods are provided with heads or enlargements $h^2$, as shown, fitting inside of the coiled spring. With this construction it will be seen that when, for instance, the rod $h$ is moved in one direction against a resistance on the rod $h'$ the coils of the spring separate, giving an elastic but positive pull or tension in that direction, and when the rod $h$, for instance, moves in the opposite direction the elasticity of the spring causes it to assume its normal position and at the same time allows the rods $h\,h'$, or either of them, to move inward toward the center of the spring. In this way a positive but elastic motion or pull is given to the rod $h'$ and any handle or device connected thereto in one direction; but the parts are allowed to recoil and assume their normal positions without producing a sudden pressure or push upon the rod $h'$ or the handle connected thereto. Furthermore, this spring construction of the connectors is mechanically advantageous in that it furnishes an elastic and yielding connection that is not liable to break or get out of order and allows a certain flexibility between the parts of the connectors. It will thus be seen that when the connectors, as described, are attached to the studs $f^5$ on the sleeves $f^2$, which are supported upon the eccentrically adjusted or supported pins $f$, and the shaft B is rotated a rapid oscillation or oscillating motion is imparted to the connectors or to the handles or other devices connected thereto, which produces a series of positive but elastic impulses or pulls in one direction without producing a positive push in the opposite direction, allowing, as it were, a recoil of the parts in assuming their normal relations.

In a device of this character it is essential that the parts be lubricated and desirable to prevent the lubricant being thrown off upon the persons or things in the neighborhood, and we show oil-cups I, I', and I², connected to various parts, and shields J, which are secured to the detachable plate A² and catch the falling oil from the bearings. We also provide an oil-shield J' in the shape of a cylinder or tube fitting over the studs or pins $f$ and sleeves thereon, and this may be provided with a bent wire or handle $j$, by means of which it can be readily detached when desired.

Sometimes it is desirable to utilize a flexible shaft connected to some sort of a mechanical vibrator, and so we provide an interchangeable slide K, (shown in Fig. 4,) which is similarly constructed to fit in the carrier E, and instead of having a pin or stud $f$ it is provided with a socket-piece $k$, preferably screw-threaded internally, adapted to receive the screw-threaded connecting-piece $l$ of the flexible shaft L, and it may be provided with a set-screw $k'$ for securing the parts together. This interchangeable slide may be used at one end of the device at the same time that the eccentric sleeve or stud is being used at the other end. We also provide a steadying-handle or frame M, which may be pivotally mounted on the head and is adapted to be grasped by the person being treated by the oscillator.

What we claim is—

1. In a tissue-oscillator, the combination with a rotary shaft, of a carrier mounted thereon having a channel with beveled sides, a slide adapted to be adjusted in said channel, a wedge-piece for locking said slide in said channel, and an oscillator-connector connected with said slide, substantially as described.

2. In a tissue-oscillator, the combination with a rotary shaft, of a carrier having a channel with beveled sides, a slide mounted in said channel, an adjusting-screw secured in the carrier and engaging the slide, a wedge-piece adapted to be interposed between the slide and beveled edge of the channel, screws for securing the wedge-piece in position, and an oscillator-connector connected with said slide, substantially as described.

3. In a tissue-oscillator, the combination with a shaft, carrier and stud, of a connector comprising a coiled-spring portion and rods loosely connected to said coiled spring, substantially as described.

4. In a tissue-oscillator, the combination with a shaft, carrier and stud, of a connector comprising a coiled spring having tapering ends and headed rods loosely connected to said spring, substantially as described.

5. In a tissue-oscillator, the combination with a shaft and carrier, of a slide carrying a stud, a sleeve mounted on the stud provided with means to receive a connector, and a detachable shield fitting the stud and sleeve, substantially as described.

6. In a tissue-oscillator, the combination with the head, shaft, carriers, connectors, and means for operating the connectors, of a steadying-rod mounted on the head, substantially as described.

In testimony whereof we have signed our names to this specification in the presence of two subscribing witnesses.

BENJ. L. W. HANFELD.
  EVANGELINE L. HANFELD.

Witnesses:
  J. B. FINSTER,
  A. ROSENSTEDT.